United States Patent
Verbiscus

(10) Patent No.: US 10,272,510 B2
(45) Date of Patent: Apr. 30, 2019

(54) ELECTRICAL DISCHARGE MACHINING APPARATUS

(71) Applicant: United Technologies Corporation, Farmington, CT (US)

(72) Inventor: Matthew S. Verbiscus, Dover, NH (US)

(73) Assignee: United Technologies Corporation, Farmington, CT (US)

(*) Notice: Subject to any disclaimer, the term of this patent is extended or adjusted under 35 U.S.C. 154(b) by 490 days.

(21) Appl. No.: 14/995,448

(22) Filed: Jan. 14, 2016

(65) Prior Publication Data

US 2017/0203376 A1     Jul. 20, 2017

(51) Int. Cl.
| | |
|---|---|
| *B23H 1/02* | (2006.01) |
| *B23H 1/06* | (2006.01) |
| *B23H 9/10* | (2006.01) |
| *B23H 11/00* | (2006.01) |
| *B23Q 3/06* | (2006.01) |
| *F01D 25/28* | (2006.01) |
| *B23H 7/06* | (2006.01) |

(52) U.S. Cl.
CPC .............. *B23H 1/028* (2013.01); *B23H 1/06* (2013.01); *B23H 9/10* (2013.01); *B23H 11/003* (2013.01); *B23Q 3/063* (2013.01); *F01D 25/285* (2013.01); *B23H 7/06* (2013.01); *F05D 2230/12* (2013.01)

(58) Field of Classification Search
CPC . B23H 1/024; B23H 1/08; B23H 5/04; B23H 1/04
USPC ............... 219/69.15, 69.11, 383, 68, 121.68, 219/121.69, 121.82; 198/803.16, 832.1; 358/299
See application file for complete search history.

(56) References Cited

U.S. PATENT DOCUMENTS

| | | | | |
|---|---|---|---|---|
| 3,700,228 A | * | 10/1972 | Peale .................. | B23Q 1/5437 269/57 |
| 4,029,929 A | * | 6/1977 | Rietveld ................. | B23H 7/06 219/69.12 |
| 4,420,671 A | * | 12/1983 | Bonga ...................... | B23H 7/06 219/69.12 |
| 4,661,678 A | * | 4/1987 | Wavre ............... | B23D 57/0046 204/206 |
| 4,841,126 A | | 6/1989 | Graeber | |

(Continued)

FOREIGN PATENT DOCUMENTS

| | | |
|---|---|---|
| CN | 101850448 | 10/2010 |
| CN | 204248430 | 4/2015 |

(Continued)

OTHER PUBLICATIONS

European Search Report for Application No. 17151513.3 dated May 29, 2017.

*Primary Examiner* — Jimmy Chou
(74) *Attorney, Agent, or Firm* — Carlson, Gaskey & Olds, P.C.

(57) ABSTRACT

An EDM machine includes a machine head, a wire guide, a machining wire extending from the wire guide to the machine head, a rotary table mounted to a first surface and a fixed table mounted to the rotary table, and a fixture mounted to the fixed table. The fixture includes a mounting portion substantially circumscribing the fixture. The mounting portion further includes a mounting surface. The mounting surface is closer to a first surface than an upper surface of the fixed table.

13 Claims, 2 Drawing Sheets

(56) References Cited

U.S. PATENT DOCUMENTS

| | | | |
|---|---|---|---|
| 5,036,174 A * | 7/1991 | Iwasaki | B23H 7/10 219/69.12 |
| 5,083,000 A * | 1/1992 | Sakaue | B23H 7/065 219/69.12 |
| 5,113,051 A * | 5/1992 | Sakaue | B23H 7/101 219/69.12 |
| 5,120,927 A * | 6/1992 | Williams | G11B 5/58 219/121.68 |
| 5,122,630 A * | 6/1992 | Reynier | B23H 7/101 219/69.12 |
| 5,225,650 A * | 7/1993 | Babel | B23K 26/0823 219/121.69 |
| 5,242,555 A * | 9/1993 | Buhler | B23H 7/06 204/297.06 |
| 5,254,826 A * | 10/1993 | Kimura | B23H 7/065 219/69.12 |
| 5,276,301 A * | 1/1994 | Kohsaka | B23H 7/04 219/69.12 |
| 5,315,087 A * | 5/1994 | Itoh | B23H 7/34 219/69.12 |
| 5,326,953 A * | 7/1994 | Ohnishi | B23H 7/10 219/69.12 |
| 5,338,912 A * | 8/1994 | Iwasaki | B23H 7/10 219/69.12 |
| 5,362,936 A * | 11/1994 | Ishibashi | B23H 7/04 219/69.12 |
| 5,410,117 A * | 4/1995 | Reynier | B23H 7/04 219/69.12 |
| 5,751,436 A * | 5/1998 | Kwon | H04N 1/10 219/121.68 |
| 5,756,953 A * | 5/1998 | Lehmann | B23H 7/02 219/69.12 |
| 5,893,984 A * | 4/1999 | Thompson | B23H 9/10 219/69.15 |
| 6,089,557 A * | 7/2000 | Obrist | B23Q 1/0081 269/309 |
| 6,326,579 B1 | 12/2001 | Krawczyk et al. | |
| 6,384,364 B1 | 5/2002 | Wei et al. | |
| 6,815,630 B1 * | 11/2004 | Ishihara | B23H 7/108 219/69.12 |
| 6,832,126 B2 * | 12/2004 | Irie | B23H 7/065 219/69.11 |
| 6,930,272 B1 | 8/2005 | Limano | |
| 7,214,901 B1 * | 5/2007 | Ball | B23H 1/00 219/69.15 |
| 7,605,339 B1 | 10/2009 | Moberg | |
| 8,288,675 B2 | 10/2012 | Beattie, Jr. | |
| 8,308,169 B2 * | 11/2012 | Dahlquist | B23B 31/02 279/126 |
| 9,604,330 B2 * | 3/2017 | Lin | B23Q 1/0072 |
| 2004/0011767 A1 * | 1/2004 | Hattori | B23H 7/065 219/69.12 |
| 2004/0011768 A1 * | 1/2004 | Beaumont | B23H 1/02 219/69.17 |
| 2004/0094515 A1 * | 5/2004 | Goto | B23H 1/022 219/69.12 |
| 2004/0211758 A1 * | 10/2004 | Mohri | B23H 1/02 219/69.16 |
| 2004/0262266 A1 * | 12/2004 | Ishiwata | B23H 1/10 219/69.2 |
| 2006/0261048 A1 * | 11/2006 | Cantello | B23K 26/0823 219/121.64 |
| 2006/0261049 A1 * | 11/2006 | Cantello | B23K 26/28 219/121.64 |
| 2007/0011861 A1 * | 1/2007 | Kosuge | B23B 5/166 29/559 |
| 2007/0251930 A1 * | 11/2007 | Liu | B23K 26/0823 219/121.82 |
| 2008/0000947 A1 | 1/2008 | Derrien et al. | |
| 2008/0277383 A1 * | 11/2008 | Sandlin | B23H 1/10 219/69.12 |
| 2009/0001053 A1 * | 1/2009 | Luo | B23H 1/04 219/69.15 |
| 2009/0212026 A1 * | 8/2009 | Sato | B23H 7/02 219/69.12 |
| 2010/0019428 A1 * | 1/2010 | Sandmeier | B23Q 1/0072 269/168 |
| 2010/0243643 A1 * | 9/2010 | Cesano | C21D 1/10 219/635 |
| 2012/0094839 A1 * | 4/2012 | Khare | B23K 26/0823 505/210 |
| 2014/0014625 A1 * | 1/2014 | Yamaoka | B23H 1/04 219/69.12 |
| 2014/0042127 A1 * | 2/2014 | Koyama | B23H 7/105 219/69.15 |
| 2014/0305908 A1 * | 10/2014 | Nakajima | B23H 7/108 219/69.12 |
| 2015/0144599 A1 * | 5/2015 | Kouda | F16C 33/6681 219/69.12 |
| 2015/0231720 A1 * | 8/2015 | Hamada | B23H 7/36 219/69.19 |
| 2015/0290734 A1 * | 10/2015 | Yamasaki | B23H 11/003 219/69.11 |
| 2015/0367437 A1 * | 12/2015 | Irie | B23H 1/024 219/69.11 |
| 2016/0136745 A1 * | 5/2016 | Hasegawa | B23H 7/20 219/69.12 |
| 2016/0263716 A1 * | 9/2016 | Lin | B23Q 1/0072 |
| 2017/0203376 A1 * | 7/2017 | Verbiscus | B23H 1/028 |

FOREIGN PATENT DOCUMENTS

| | | |
|---|---|---|
| CN | 103612129 | 12/2015 |
| DE | 4203656 | 8/1993 |
| EP | 0186793 | 7/1986 |

* cited by examiner

ELECTRICAL DISCHARGE MACHINING APPARATUS

STATEMENT REGARDING FEDERALLY SPONSORED RESEARCH OR DEVELOPMENT

This invention was made with government support under contract number FA 8650-09-D-2923-0021 awarded by the United States Air Force. The government has certain rights in the invention.

TECHNICAL FIELD

The present disclosure relates generally to an apparatus for Electrical Discharge Machining (EDM Machining), and more specifically to a rotary table fixture for the same.

BACKGROUND

Aircraft components, such as vane clusters, rotor clusters, and the like, are in some cases manufactured as an annular component. In order to properly assemble the turbine engine that the components are for, the full ring must be split into multiple distinct segments. The segments are then installed and reconnected in a manner that reconstructs the full ring within the turbine engine.

In some examples, the aircraft component is split into segments using a machining process, such as electrical discharge machining (EDM). In one example system, an EDM machine utilizes a guide wire that machines into and through a component to split the component into segments.

Certain configurations of components, and engine installation requirements, can dictate that the guide wire be angled relative to a line normal to a base surface of the EDM machine. Due to physical constraints, such as part size and EDM machine size, a typical EDM machine has a maximum angle at which the part can be cut, and a maximum clearance height of parts that can be cut. As a result of the physical constraints, EDM machines are limited in what size parts can be worked, and in what type of working can be done to the parts.

SUMMARY OF THE INVENTION

In one exemplary embodiment an Electrical Discharge Machining (EDM Machining) machine includes a machine head, a wire guide, a machining wire extending from the wire guide to the machine head, a rotary table mounted to a first surface and a fixed table mounted to the rotary table, and a fixture mounted to the fixed table, the fixture including a mounting portion substantially circumscribing the fixture, the mounting portion further including a mounting surface, the mounting surface being closer to a first surface than an upper surface of the fixed table.

In another exemplary embodiment of the above described EDM machine the mounting portion includes a plurality of radial slots disposed about the circumference of the fixture.

In another exemplary embodiment of any of the above described EDM machines the mounting portion includes a plurality of sections, each of the sections being separated from an adjacent section by one of the radial slots and each of the sections including at least one fastener feature configured to mount a clamping device.

In another exemplary embodiment of any of the above described EDM machines the at least one fastener feature configured to mount a clamping device comprises a pair of threaded holes.

In another exemplary embodiment of any of the above described EDM machines at least one of the plurality of sections includes a key slot, the key slot being a radial insertion at an outer edge of the section.

In another exemplary embodiment of any of the above described EDM machines the plurality of sections comprise sections of at least two distinct arc lengths.

In another exemplary embodiment of any of the above described EDM machines the machining wire is disposed an angle greater than 25 degrees, the angle being drawn relative to a line normal to the first surface.

In another exemplary embodiment of any of the above described EDM machines the angle is greater than or equal to 30 degrees.

In another exemplary embodiment of any of the above described EDM machines the rotary table is mounted to the surface via a slide configured to allow the rotary table to slide in a linear direction.

In another exemplary embodiment of any of the above described EDM machines the mounting surface includes a clocking feature protruding outward from the mounting surface.

In one exemplary embodiment a fixture for an Electrical Discharge Machining (EDM) machine includes a center portion including a top face, relative to a gravitational direction, a mounting portion substantially circumscribing the circular center portion, the mounting portion including a mounting face aligned with the top face, the mounting face being lower than the top face, relative to the gravitational direction, and the mounting portion being connected to the center portion via a trough section having a hook shaped cross-section.

In another exemplary embodiment of the above described fixture for an EDM machine the mounting portion is divided into a plurality of sections, each of the sections being separated from each adjacent section by a slot.

In another exemplary embodiment of any of the above described fixtures for an EDM machine each section in the plurality of sections has an approximately identical arc length.

In another exemplary embodiment of any of the above described fixtures for an EDM machine the plurality of sections includes at least a first plurality of sections having a first arc length, and a second plurality of sections having a second arc length, distinct form the first arc length.

In another exemplary embodiment of any of the above described fixtures for an EDM machine a subset of the plurality of sections includes a clocking pin.

In another exemplary embodiment of any of the above described fixtures for an EDM machine one of the plurality of sections includes a keying feature.

In another exemplary embodiment of any of the above described fixtures for an EDM machine the keying feature is a radially inward protrusion into the section.

In another exemplary embodiment of any of the above described fixtures for an EDM machine each of the slots is sized to receive a wire guide of an EDM machine.

An exemplary method for mounting an annular component to an electrical discharge machining (EDM) machine includes mounting a fixture to a fixed table of an EDM machine such that a clearance between a mounting surface of the fixture and a machining head is larger than a clearance between a top surface of the fixed table and the machining head, and mounting the annular component to the mounting surface of the fixture.

Another example of the above described exemplary method for mounting an annular component to an electrical discharge machining (EDM) machine further includes orienting the annular component relative to the fixture via a clocking pin, and orienting the fixture relative to a machining head via at least one keying feature.

These and other features of the present invention can be best understood from the following specification and drawings, the following of which is a brief description.

DETAILED DESCRIPTION OF AN EMBODIMENT

Figure 1:
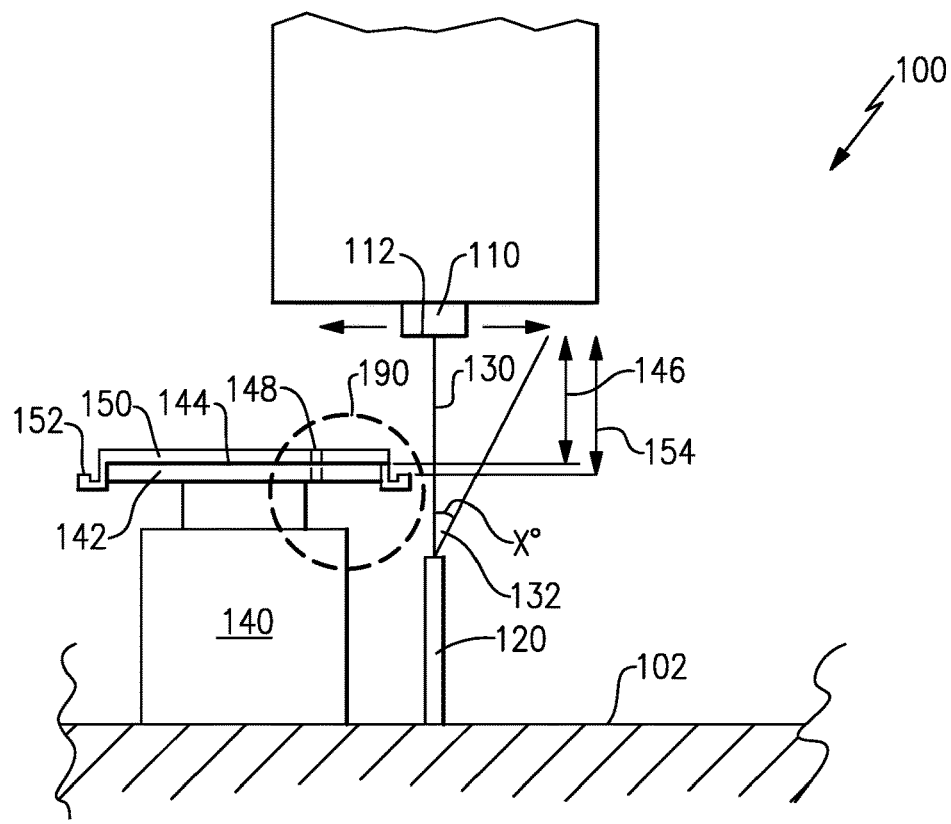
FIG. 1 schematically illustrates an example electrical discharge machining (EDM) system.

FIG. 1 schematically illustrates an electrical discharge machining (EDM) system 100. The exemplary EDM system 100 is suited for cutting annular turbine components into segments for assembly within a turbine engine. One of skill in the art, however, will recognize that alternative uses of the illustrated EDM system 100 will fall within the following scope. The general process of EDM machining is understood in the art.

The EDM system 100 includes a machining head 110 that is connected to a wire guide 120 via a machining wire 130. The wire guide 120 is mounted to a surface 102 and the machining wire 130 extends upwards to the machining head 110 from the wire guide 120. A rotary table 140 is positioned on the surface 102 adjacent to the wire guide 120. The rotary table 140 is mounted to a sliding component (not illustrated) that allows the rotary table 140 to slide into, and out of, the machining wire 130 during operation. A fixed table 142 is mounted to the top of the rotary table 140, and is configured to hold an annular component that is being split via the EDM system 100. To split an annular component, the component is mounted to the fixed table 142. Then the rotary table 140 is slid into the machining wire 130, and the machining wire 130 cuts the component using an electrical discharge. The rotary table 140 is slid back away from the machining wire 130, and rotated to a new position. This process is reiterated until a desired number of cuts is achieved.

A maximum height of the component being worked by the EDM system 100 is defined by a clearance 146 between a top surface 144 of the fixed table 142 and a bottom surface 112 of the machining head 110.

While the wire guide 120 is located in a fixed position on the surface 102, the machining head 110 is capable of moving in a plane parallel to the surface 102. By moving the machining head 110, relative to the wire guide 120, the machining wire 130 can be angled resulting in an angled cut. Due to the particular clearances 146 of the rotary table 140 and the height of the wire guide 120, an angle 132 of the machining wire 130 is, in some examples, limited to 25 degrees or lower. The angle 132 is relative to a line normal to the surface 102.

Certain annular components require a larger clearance 146 of the fixed table 142, a greater angle 132 of the machining wire 130, or both, in order to make the desired cuts. In order to facilitate such components, a fixture 150 is attached to the fixed table 142. The fixture 150 extends beyond the outer circumference of the fixed table 142 and includes a hook shaped under hang portion. The under hang portion includes a mounting surface 152. The annular component being worked can be mounted to the mounting surface 152. The mounting surface 152 is connected to the center portion by a trough. Because the mounting surface 152 is below the surface 144 of the fixed table 142, a part clearance 154 of the EDM system 100 including the fixture 150 is larger than the clearance 146 without the fixture 150. This, in turn, allows components having a larger height to be worked.

Additionally, the fixture 150 extends beyond the circumference of the fixed table 142. By mounting the component being worked beyond the outer circumference of the fixed table 142, the wire guide 120 can be taller, thereby allowing for a greater angle 132 on the machining wire 130, without increasing the movement of the machining head 110. In some examples, the angle 132 can be increased to greater than 25 degrees. In yet further examples, the angle can be increased to greater than or equal to 30 degrees.

The fixture 150 is attached to the fixed table 142 via one or more fasteners. In the illustrated example of FIG. 1, the fixture 150 includes a through hole 148 that is aligned with a corresponding through hole 148 in the fixed table 142. A bolt passes through the through hole 148 and maintains the fixture 150 in position. In some examples, the through hole 148 can be threaded, and the bolt is a threaded bolt. In other examples, the through hole 148 can be smooth, and a bolt and nut configuration is used. One of skill in the art will recognize that alternative fastener means can be utilized to similar effect and hold the fixture 150 in position on the fixed table 142.

Figure 2:
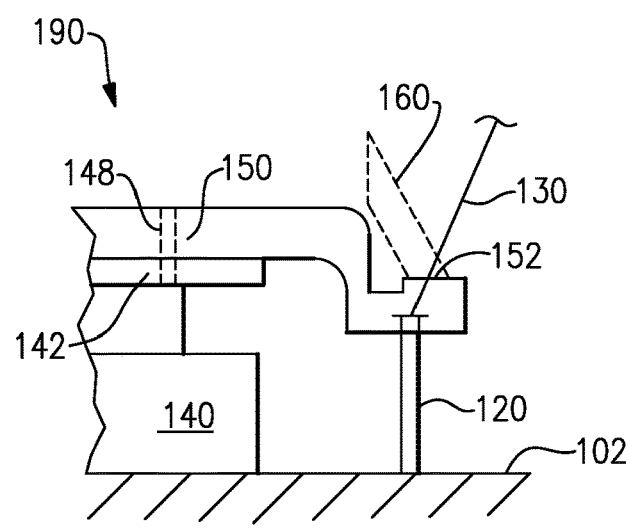
FIG. 2 schematically illustrates an enhanced view of a portion of the EDM machining system of FIG. 1.

With continued reference to FIG. 1, FIG. 2 schematically illustrates an enhanced view of a portion 190 of the EDM system 100 of FIG. 1. In addition to the EDM system 100, the zoomed in portion includes a component 160 being worked by the EDM system 100, and illustrates the machining wire 130 at an angle of greater than 25 degrees. By lowering the mounting surface 152 of the fixture 150, relative to the top surface 144 of the fixed table 142, a corresponding increase in clearance is achieved, thereby allowing a taller component 160 to be worked by the machine. Further, the fixture 150 includes a slot (illustrated in FIGS. 3-4B) of sufficient size to fit the wire guide 120. The slot allows the wire guide 120 to protrude partially into the fixture 150 during operation of the EDM system 100, thereby allowing for a taller wire guide 120, and a larger angle 132 of the machining wire 130 to be utilized.

Additional features, such as clamp connections, key slots, multiple segments, etc. can be incorporated in the fixture 150, and are discussed below.

Figure 3:
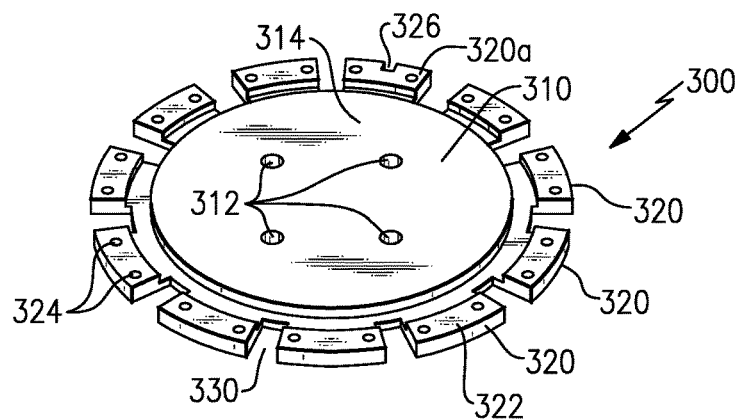
FIG. 3 schematically illustrates an isometric view of an embodiment of a fixture for decreasing the physical constraints of the EDM machining system of FIG. 1.

With continued reference to FIGS. 1 and 2, FIG. 3 schematically illustrates an isometric view of a fixture 300 that could be used as the fixture 150 of FIGS. 1 and 2. The fixture 300 includes a center portion 310 configured to rest on the top surface 144 of the fixed table 142. In the illustrated example, the fixture 300 includes four bolt holes 312, each of which corresponds to a bolt hole in the fixed table. Bolts are passed through the bolt holes 312 in the fixture 300 and the fixed table 142, thereby maintaining the fixture in position relative to the fixed table 142. Alternative fixtures can utilize alternative numbers and forms of fastener features to fasten the fixture 300 to the fixed table 142 (illustrated in FIGS. 1 and 2).

Multiple sections 320 extend radially outward from the center portion 310, with a mounting surface 322 of each section 320 being lower than a top surface 314 of the center portion 310. Each section 320 is separated from each adjacent section 320 via a slot 330. The slots 330 are sized to fit around the wire guide 120 (illustrated in FIG. 1) and facilitate the splitting of the component being worked. Each of the sections 320 further includes two clamp features 324. The clamp features 324 are configured to mount clamps to the sections 324, and allow a clamping structure to maintain the position of the component being worked during the machining process.

Each of the sections 320 has a substantially hook shaped cross-section (illustrated in FIG. 4A) with the body having the mounting surface 322 being connected to the center portion 310 via a trough, or valley, connection.

In the illustrated example of FIG. 3, one of the sections 320a includes a keying feature 326. The keying feature 326 is a radially inward protruding notch in the section 320a. In some examples the notch extends a full height of the section 320a. In alternative examples, the notch extends a partial height of the section 320a. In either case, the keying feature 326 is used to align the fixture 300, once a component has been mounted on the fixture 300, in order to ensure that the machining is begun and stopped at the correct position. In some examples, the keying feature 326 includes a tram slot. The tram slot clocks the fixture 300 to the machine. In this way, the controller knows the positions of the fixture 300 and part relative to the machine, allowing the machine to perform cuts in the correct positions.

Figure 4A:
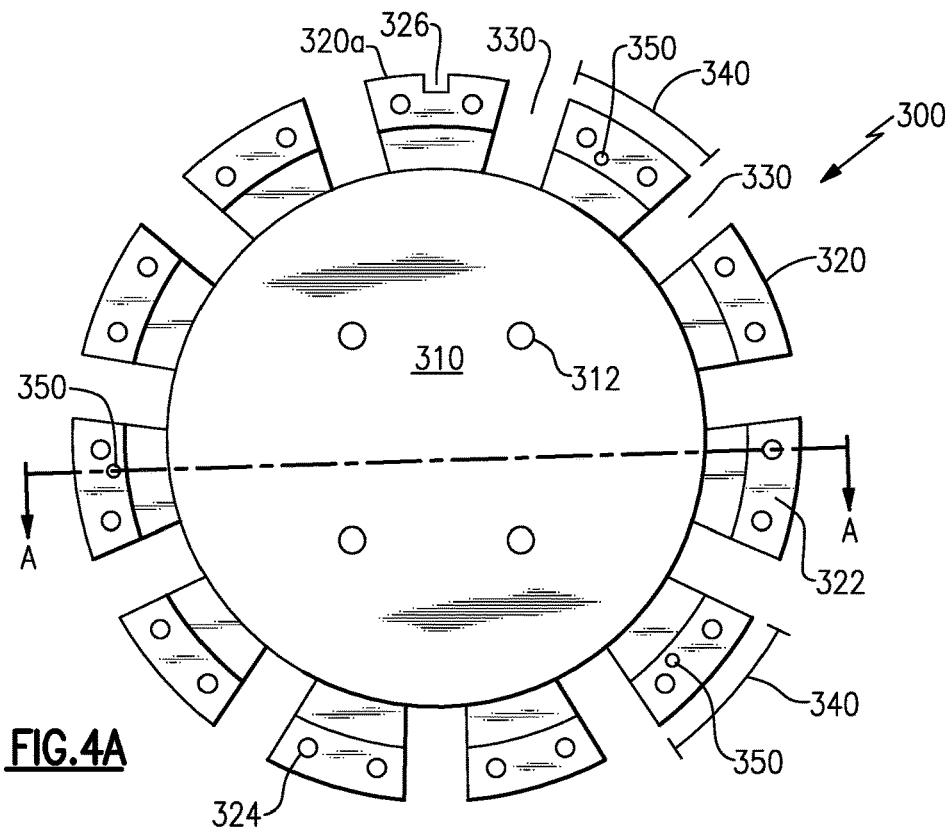
FIG. 4A schematically illustrates a top view of the fixture of FIG. 3.
Figure 4B:
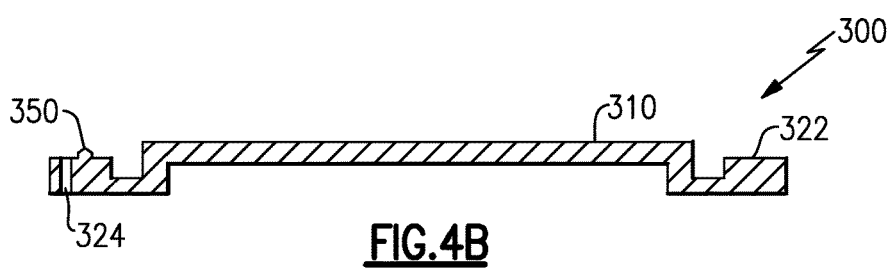
FIG. 4B schematically illustrates a cross-sectional view of the fixture of FIG. 3.

With continued reference to FIG. 3, and with like numerals indicating like elements, FIGS. 4A and 4B illustrate the fixture 300 in greater detail, with FIG. 4A illustrating a top view, and with FIG. 4B illustrating a cross-sectional view of the fixture 300 drawn along cross-sectional view line A-A. As can be seen in FIG. 4A, each of the sections 320 extends for a set arc length 340 between two adjacent slots 330. In the illustrated example, the arc lengths 340 of the sections are inconsistent, and are specifically configured according to the segmentation parameters of a given component to be worked in conjunction with the fixture 300. In some examples, each of the sections can be one of two different arc lengths. In alternative examples, any number of different arc lengths can be used.

Also included on a subset of the sections 320 are clocking pins 350. In the illustrated example, three of the sections 320 include clocking pins 350. The clocking pins 350 correspond to a clocking feature of the component being worked, and ensure that the component is placed on the fixture 300 in the correct orientation. Each of the clocking pins 350, is a nub that protrudes upward from the mounting surface 322. The clocking pins 350 are dispersed about the sections 320 such that the component to be worked can only interface with the fixture 300 in a single orientation. This ensures that the splits machined into the component occur in the correct location. In alternative examples, alternative numbers and types of clocking features can be utilized in place of the clocking pins 350 described above. In yet further alternate examples, only a single section 320 includes a clocking pin 350. One of skill in the art, having the benefit of this disclosure, will understand that any specific number and configuration of clocking pins 350 can be utilized to accurately clock the part to the fixture 350.

In alternative examples, the sections 320 can be uniform in size and arc length 340. In such an example, the clocking pins 350 can be evenly distributed about multiple sections 320, and the component can interface with the fixture 300 in multiple distinct orientations.

While the EDM machining apparatus and fixtures described above are adapted for working a turbine engine component, one of skill in the art having the benefit of this disclosure will understand that the apparatus and concept described herein can be utilized in the machining and working of any part and is not limited to the working of aircraft engine parts or turbine parts.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An Electrical Discharge Machining (EDM) machine comprising:
   a machine head;
   a wire guide;
   a machining wire extending from said wire guide to said machine head;
   a rotary table mounted to a first surface at a first end of the rotary table and a fixed table mounted to the rotary table at second end of the rotary table, the second end being opposite the first end; and
   a fixture mounted to the fixed table, the fixture including a mounting portion substantially circumscribing the fixture, the mounting portion further including a mounting surface, said mounting surface being closer to the first surface than an upper surface of said fixed table.

2. The EDM machine of claim 1, wherein the mounting portion includes a plurality of radial slots disposed about a circumference of the fixture.

3. The EDM machine of claim 2, wherein the mounting portion includes a plurality of sections, each of said sections being separated from an adjacent section by one of said radial slots and each of said sections including at least one fastener feature configured to mount a clamping device.

4. An Electrical Discharge Machining (EDM) machine comprising:
   a machine head;
   a wire guide;
   a machining wire extending from said wire guide to said machine head;
   a rotary table mounted to a first surface and a fixed table mounted to the rotary table;
   a fixture mounted to the fixed table, the fixture including a mounting portion substantially circumscribing the fixture, the mounting portion further including a mounting surface, said mounting surface being closer to the first surface than an upper surface of said fixed table, and including a plurality of radial slots disposed about a circumference of the fixture; and
   the mounting portion further including a plurality of sections, each of said sections being separated from an adjacent section by one of said radial slots and each of said sections including at least one fastener feature comprising a pair of threaded holes and being configured to mount a clamping device.

5. An Electrical Discharge Machining (EDM) machine comprising:
   a machine head;

a wire guide;

a machining wire extending from said wire guide to said machine head;

a rotary table mounted to a first surface and a fixed table mounted to the rotary table;

a fixture mounted to the fixed table, the fixture including a mounting portion substantially circumscribing the fixture, the mounting portion further including a mounting surface, said mounting surface being closer to the first surface than an upper surface of said fixed table, and including a plurality of radial slots disposed about a circumference of the fixture;

the mounting portion further including a plurality of sections, each of said sections being separated from an adjacent section by one of said radial slots and each of said sections including at least one fastener feature configured to mount a clamping device; and wherein at least one of said plurality of sections includes a key slot, the key slot being a radial insertion at an outer edge of the section.

6. An Electrical Discharge Machining (EDM) machine comprising:

a machine head;

a wire guide;

a machining wire extending from said wire guide to said machine head;

a rotary table mounted to a first surface and a fixed table mounted to the rotary table;

a fixture mounted to the fixed table, the fixture including a mounting portion substantially circumscribing the fixture, the mounting portion further including a mounting surface, said mounting surface being closer to the first surface than an upper surface of said fixed table, and including a plurality of radial slots disposed about a circumference of the fixture; and the mounting portion further including a plurality of sections, the plurality of sections including sections of at least two distinct arc lengths, each of said sections being separated from an adjacent section by one of said radial slots and each of said sections including at least one fastener feature configured to mount a clamping device.

7. The EDM machine of claim 1, wherein the machining wire is disposed an angle greater than 25 degrees, the angle being drawn relative to a line normal to the first surface.

8. The EDM machine of claim 7, wherein the angle is greater than or equal to 30 degrees.

9. The EDM machine of claim 1, wherein the rotary table is mounted to the first surface via a slide configured to allow the rotary table to slide in a linear direction.

10. The EDM machine of claim 1, wherein said mounting surface includes a clocking feature protruding outward from said mounting surface.

11. The EDM machine of claim 1, wherein the first surface is a static surface.

12. The EDM machine of claim 1, wherein the machine head is configured to move in a plane parallel to the first surface.

13. The EDM machine of claim 2, wherein the circumference of the fixture extends beyond a circumference of the rotary table.

* * * * *